O. MOULTON.
Car Wheel.

No. 8,772.  Patented Mar. 2, 1852.

UNITED STATES PATENT OFFICE.

ORSON MOULTON, OF BLACKSTONE, MASSACHUSETTS.

CAST-IRON CAR-WHEEL.

Specification of Letters Patent No. 8,772, dated March 2, 1852.

*To all whom it may concern:*

Be it known that I, ORSON MOULTON, of Blackstone, in the county of Worcester and State of Massachusetts, have invented certain new and useful Improvements in Cast-Iron Railroad-Wheels; and I do hereby declare that the following is a full, clear, and exact description of the same, reference being had to the accompanying drawings, forming part of this specification, in which—

Figure 1:
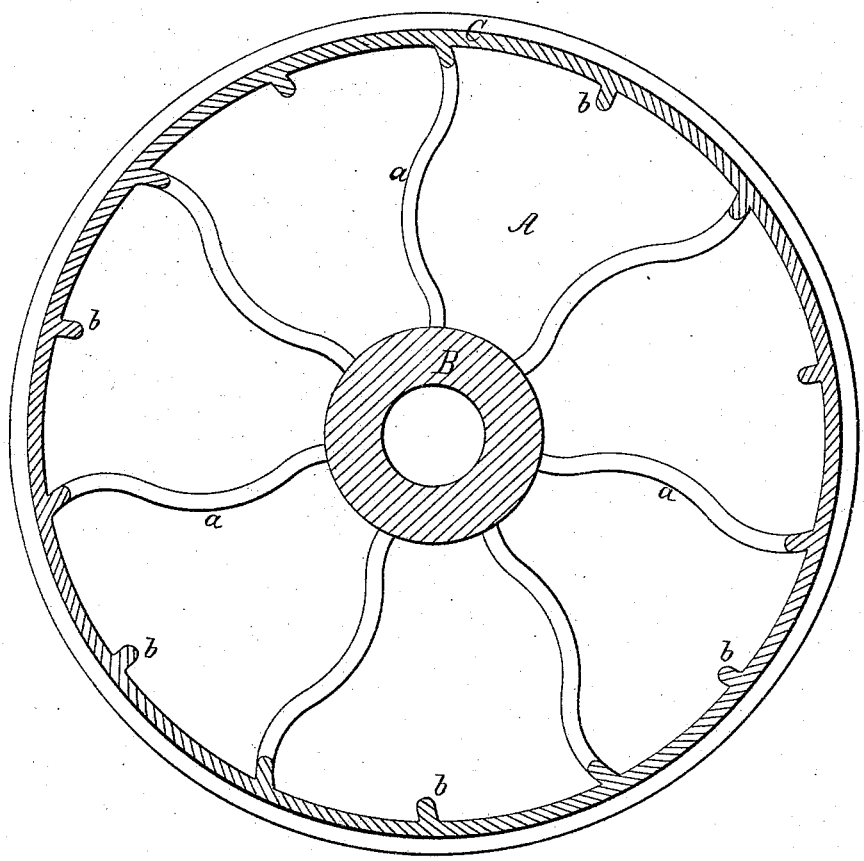
Figure 2:
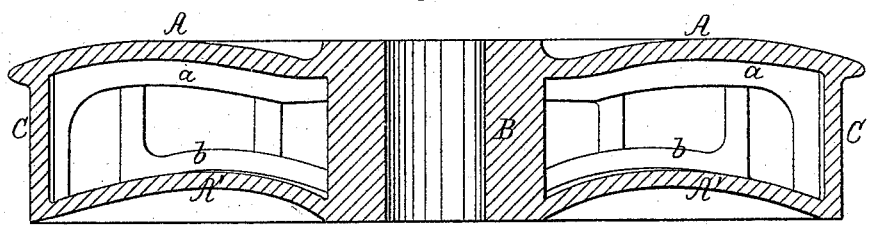

Figure 1 is a section of one of my improved wheels in a plane perpendicular to the axis. Fig. 2 is a diametrical section of the same.

Similar letters of reference indicate corresponding parts in each of the several figures.

This invention consists in connecting the hub and rim by two curved plates, having raised or projecting ribs running in cyma form on their inner sides from the hub to the rim and across the inside of the rim, the ribs on each side being placed opposite the middle of the space between those on the opposite side. The forms of the plates A, A', which connect the hub B, and rim C, are best seen in Fig. 2. The form of the ribs a, a, on the back or inside plate A, are shown in Fig. 1. The form of b, b, on the front or outer plate A, is precisely the same, both extending across the rim and terminating on the opposite plates, as may be seen in Fig. 2.

The pattern for the outside of the wheel is merely a solid block of the requisite form and the core for the inside is formed in a box, which is made in two parts corresponding to two halves of the wheel. Provision is made for the inequality of shrinkage in every direction by the curvature of the plates and of the ribs. The extension of the ribs across the inside of the rim give it great strength, and render it unnecessary that it should be of great thickness. The whole arrangement and distribution of strength is such that the greatest possible capability of sustaining weight, and resisting the effects of jarring and percussion, are obtained at the least possible expense of material.

What I claim as my invention, and desire to secure by Letters Patent, is—

Connecting the hub and rim of rail road wheels by curved parts A, A, having raised or projecting ribs a, a, and b, b, of cyma form on their inner sides, extending also across the inside of the rim, the said ribs on each plate being placed opposite the middle of the spaces between those on the opposite plate, and each rib terminating in the opposite plate to that on which it stands.

ORSON MOULTON.

Witnesses:
OLIVER W. MAY,
JOSEPH P. WEBSTER.